W. S. HADAWAY, Jr.
ELECTRIC BROILER.
APPLICATION FILED MAR. 4, 1916.
1,345,004.
Patented June 29, 1920.
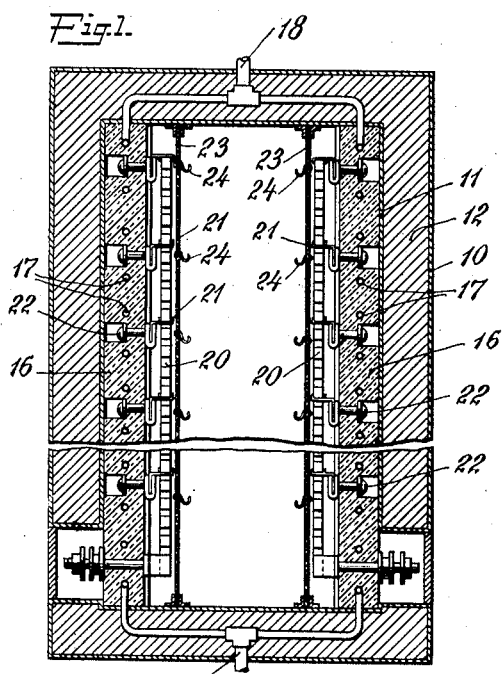
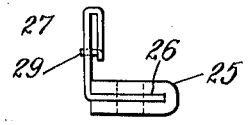
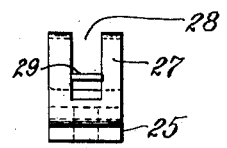
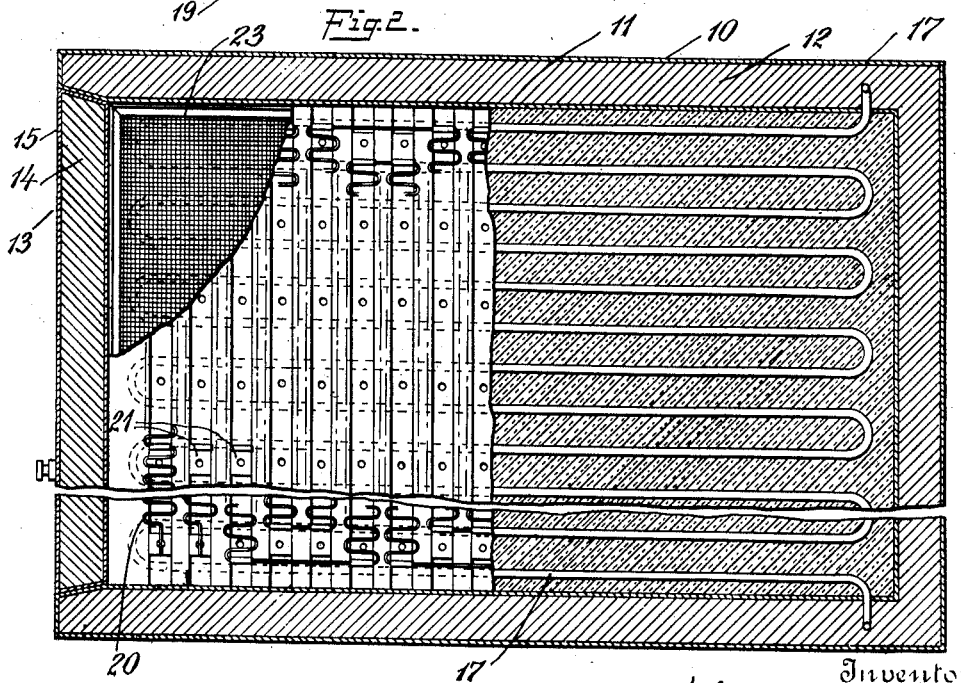
Inventor
William S. Hadaway Jr.
By his Attorney

UNITED STATES PATENT OFFICE.

WILLIAM S. HADAWAY, JR., OF NEW ROCHELLE, NEW YORK.

ELECTRIC BROILER.

1,345,004.  Specification of Letters Patent.  Patented June 29, 1920.

Application filed March 4, 1916. Serial No. 82,071.

*To all whom it may concern:*

Be it known that I, WILLIAM S. HADAWAY, Jr., a citizen of the United States of America, and a resident of New Rochelle, Westchester county, and State of New York, have invented certain new and useful Improvements in Electric Broilers, of which the following is a specification, reference being had to the accompanying drawings, forming a part thereof.

My invention relates to heating appliances and has special reference to electric heaters which are adapted to operate at a radiant temperature, and are intended for broiling meats and similar operations.

In my Patent No. 1,155,483, granted October 5, 1915, I have shown and described a heater which is structurally similar in many particulars to the preferred embodiment of my present invention, and which comprises a base plate or slab having a large heat capacity and radiant electric heater units disposed close to the base or slab, but spaced slightly therefrom.

One object of my present invention is to retain the advantages of my previous invention and at the same time to reduce the inertia of the device in operation and thereby materially curtail the expense necessarily involved in supplying it with energy.

In other words, it has been my aim to provide a radiant temperature heater which shall be ready for use almost instantly when electric energy is supplied to it and which shall receive a large proportion of its heat energy from an inexpensive source so that only a relatively small amount of electric energy is required.

Another object of my invention is to provide a broiler that shall comprise a body having not only a relatively large heat capacity, but also one which is supplied continuously with heat energy from a relatively inexpensive source, whereby it is maintained at a temperature which is very materially above the normal room temperature; and a radiant electric heater closely associated with the heated body but spaced slightly from it and supplied with electric energy whereby it is maintained at a radiant temperature which is high relative to the temperature of the adjacent heated body.

Still another object of my invention is to provide a heated body of large heat capacity which may, for example, have a steam or hot water coil embedded in it and an electric heater adjacent to the body so arranged that the body of large heat capacity reacts upon the electric heater enabling a radiant temperature to be produced and maintained with the expenditure of a relatively small quantity of electric energy.

Other objects and advantages of my invention will be set forth hereinafter, and in order that my invention may be thoroughly understood, I will now proceed to describe the same in the following specification and then point out the novel features thereof in appended claims.

In the drawings:

Figure 1 is a sectional elevation of a broiler arranged and constructed in accordance with, and embodying my invention.

Fig. 2 is a sectional elevation at right angles to Fig. 1, with certain of the parts broken away to more clearly designate the structural details, of the electric heater and of the steam-heated body with which it is associated.

Certain parts of the structure are shown in detail on a larger scale, in Figs. 3 and 4.

The broiler illustrated comprises an outer shell or casing 10, an inner shell 11 and an interposed body 12 of heat insulating material. The inner and outer shells are preferably formed of sheet metal and the insulating mass or body may be of any suitable material. The broiler has the general form of a narrow box and has a door 13 which is constructed to correspond to the body of the broiler having a mass 14 of insulation incased in sheet metal 15.

Mounted within the casing on its opposite inside walls, are a pair of slabs 16 which may be formed of soapstone or fire clay or some other suitable substance and have relatively large heat capacity. Embedded in the slabs are heating coils 17 to which steam is supplied from any suitable source through a pipe 18, the exhaust steam being discharged through a pipe 19.

A zigzag resistance ribbon 20 is supported by clips 21 adjacent to the inner surface of each of the slabs 16. It is spaced slightly from the surface but is supported by the clips 21 which are secured to the slabs by rivets or screws 22.

The resistance ribbons are protected by screens 23, which are removably mounted within the broiler and have a plurality of hooks 24 extending inwardly to constitute a suitable means for supporting a toasting or broiling rack in which the meat or other food is held.

As clearly shown in Figs. 3 and 4, each of the clips 21 comprises a nut 25 having a slot 26 into which is set an L-shaped supporting bracket 27 preferably formed of sheet metal. The nut itself is also preferably formed of sheet metal of a somewhat heavier stock, by folding a rectangular sheet on itself. The outwardly extending arm of the bracket 27 is provided with a notch 28 and is folded inwardly with the tongue 29 extending laterally through the notch to provide a double support for the resistance ribbon.

The details of this structure form no part of my present invention and it is evident that the resistance ribbon may be supported by any desired means. In fact, the electric heater elements may be formed of wires instead of straps, or built in some other suitable manner.

In my Patent No. 1,155,483, to which reference has already been made, I have pointed out the advantages of the slab having a relatively large heat capacity, but my present invention differs materially from that of the aforesaid patent because in my present invention I do not rely upon electric heating elements to impart heat to the slab or body of large heat capacity, but supply heat thereto from another and less expensive source. With this arrangement, it is economically possible to continuously supply a greater or less quantity of heat to the slab for the purpose of maintaining its temperature substantially constant at all times, so that when it is desired to utilize the broiler, it is only necessary to turn on the electric energy to secure immediate results. In fact, the broiler of my present invention operates with a maximum effectiveness from the start.

As already intimated, the structure illustrated may be modified in various ways without departing from the spirit and scope of my invention, and I intend that only such limitations be imposed as are indicated in the appended claims.

What I claim is:

1. A heater comprising a heated body having a working surface and a large heat capacity, thermal insulation for preventing the dissipation of heat therefrom except from the working surface thereof, and a radiant electric heater element spaced at a short distance from the working surface of the body, whereby the temperature of the heater is the resultant of the heat generated electrically in the radiant heater and heat supplied thereto from the adjacent body.

2. A heater comprising a heated body of large heat capacity having an exposed working surface, means for supplying heat to said body to maintain a predetermined minimum temperature level, and a radiant electric heating element adjacent to but spaced slightly from the working surface thereof.

3. A broiler comprising a heated body of large heat capacity having an exposed working surface, means for supplying heat to said body to maintain a predetermined minimum temperature level, a radiant electric heating element adjacent to but spaced slightly from the working surface thereof, and means for supporting articles to be broiled close to the radiant electric heating element.

4. A heater comprising a body of large heat capacity having an exposed working surface, relatively low cost means for maintaining the body at a predetermined temperature below the working temperature of the heater, and an electric heating element spaced at a short distance from the exposed working surface of the heated body adapted to operate at a glowing temperature arranged to be influenced by and to act upon the working surface of said body.

5. A heater comprising a slab having a large heat capacity and an exposed working surface, a steam heating passage within said slab for supplying a relatively large quantity of heat thereto at an intermediate temperature between the atmosphere and the working temperature of the device, and a radiant electric heating element close to but spaced slightly from the working surface of said heated slab adapted to be maintained at a relatively high temperature with an expenditure of a small amount of electric energy and to act upon the working surface of said body.

6. A broiler comprising a slab having a large heat capacity and an exposed working surface, a steam heating passage within said slab for supplying a relatively large quantity of heat thereto at an intermediate temperature between the atmosphere and the working temperature of the device, a radiant electric heating element close to but spaced slightly from the working surface of said heated slab and adapted to be maintained at a relatively high temperature with an expenditure of a small amount of electric energy, and to act upon the working surface of said body, and means for supporting articles to be broiled close to the radiant electric heating element.

7. A broiler comprising a heated body of large heat capacity having an exposed working surface, means for supplying heat to said body, and a radiant electric heating element of skeleton form adjacent to but spaced slightly from the working surface thereof arranged to be influenced by and to act upon the working surface of said body.

In witness whereof, I have hereunto set my hand this 29 day of February, 1916.

WILLIAM S. HADAWAY, Jr.